US012802507B2

(12) United States Patent
Irie

(10) Patent No.: US 12,802,507 B2
(45) **Date of Patent: *Nov. 17, 2026**

(54) GATE APPARATUS, SERVER APPARATUS, EMIGRATION AND IMMIGRATION EXAMINATION SYSTEM, CONTROL METHOD OF GATE APPARATUS, AND CONTROL METHOD OF SERVER APPARATUS

(71) Applicant: NEC Corporation, Tokyo (JP)

(72) Inventor: Fumi Irie, Tokyo (JP)

(73) Assignee: NEC CORPORATION, Tokyo (JP)

( * ) Notice: Subject to any disclaimer, the term of this patent is extended or adjusted under 35 U.S.C. 154(b) by 78 days.

This patent is subject to a terminal disclaimer.

(21) Appl. No.: 18/795,331

(22) Filed: Aug. 6, 2024

(65) Prior Publication Data

US 2024/0395089 A1 Nov. 28, 2024

Related U.S. Application Data

(63) Continuation of application No. 17/788,878, filed as application No. PCT/JP2020/000186 on Jan. 7, 2020, now Pat. No. 12,094,277.

(51) Int. Cl.
*G07C 9/10* (2020.01)
*G06V 40/16* (2022.01)
(Continued)

(52) U.S. Cl.
CPC ............ *G07C 9/10* (2020.01); *G06V 40/165* (2022.01); *G06V 40/171* (2022.01);
(Continued)

(58) Field of Classification Search
CPC .... G06F 21/32; G06Q 10/0635; G06Q 10/10; G06Q 10/02; G06Q 20/40145;
(Continued)

(56) References Cited

U.S. PATENT DOCUMENTS 5,869,822 A 2/1999 Meadows, II ..... G06V 40/1347 235/380
6,662,078 B1 12/2003 Hardgrave ............ G06Q 10/02 700/229
(Continued)

FOREIGN PATENT DOCUMENTS

JP 2007-249819 A 9/2007
JP 2009-301076 A 12/2009
(Continued)

OTHER PUBLICATIONS

SG Search Report and Written Opinion for Singapore Patent Application No. 11202251127F, issued on Jul. 15, 2025.
(Continued)

*Primary Examiner* — Stephen R Burgdorf
(74) *Attorney, Agent, or Firm* — Sughrue Mion, PLLC

(57) ABSTRACT

A gate apparatus includes an acquisition unit, a matching request unit, and a control unit. The acquisition unit acquires biological information about an examination target user. The matching request unit requests a server apparatus that stores biological information about users and MRZ (Machine Readable Zone) information written in machine readable zones in passports issued to the users in association with each other to perform matching on the biological information about the examination target user. The control unit controls a gate so that the examination target user can pass through the gate if information is successfully read out from an IC (Integrated Circuit) chip in a passport issued to the examination target user by using MRZ information determined by the matching.

10 Claims, 12 Drawing Sheets

(51) Int. Cl.
*G07C 9/25* (2020.01)
*G07C 9/27* (2020.01)

(52) U.S. Cl.
CPC .......... *G06V 40/172* (2022.01); *G07C 9/257* (2020.01); *G07C 9/27* (2020.01)

(58) Field of Classification Search
CPC ............ G06Q 30/0255; G06Q 40/123; G06Q 50/265; G06V 40/165; G06V 40/171; G06V 40/172; G07C 9/00; G07C 9/00563; G07C 9/10; G07C 9/257; G07C 9/27
USPC ........................................................ 340/5.7
See application file for complete search history.

(56) References Cited

U.S. PATENT DOCUMENTS

| | | | | |
|---|---|---|---|---|
| 7,543,337 | B2 * | 6/2009 | D'Agnolo | B42D 25/24 726/20 |
| 9,087,204 | B2 | 7/2015 | Gormley | H04L 9/08 |
| 9,235,782 | B1 * | 1/2016 | Zomet | G06V 40/171 |
| 2007/0260886 | A1 * | 11/2007 | Dufour | G06V 40/10 713/186 |
| 2010/0308108 | A1 | 12/2010 | Choi | G07C 9/10 235/382 |
| 2015/0281232 | A1 | 10/2015 | Gormley et al. | |
| 2016/0125179 | A1 | 5/2016 | Bouatou | G06F 21/32 340/5.82 |
| 2017/0046808 | A1 | 2/2017 | Parrish et al. | |
| 2017/0195309 | A1 | 7/2017 | Schmalz et al. | |
| 2017/0345235 | A1 | 11/2017 | Touret et al. | |
| 2018/0342120 | A1 | 11/2018 | Van De Walle De Ghelcke | B42D 25/24 |
| 2019/0278975 | A1 | 9/2019 | Hayase et al. | |
| 2020/0118375 | A1 * | 4/2020 | Tagawa | G07C 9/00 |
| 2020/0320813 | A1 | 10/2020 | Bergmann | G07C 9/257 |
| 2021/0166048 | A1 * | 6/2021 | Ando | G06V 40/10 |
| 2022/0172218 | A1 * | 6/2022 | Nakahira | G07C 9/38 |
| 2022/0222991 | A1 * | 7/2022 | Hatae | G06Q 30/06 |

FOREIGN PATENT DOCUMENTS

| | | | |
|---|---|---|---|
| JP | 2013-149111 | A | 8/2013 |
| JP | 2015-082194 | A | 4/2015 |
| JP | 2018-055193 | A | 4/2018 |
| JP | 2018-109935 | A | 7/2018 |
| JP | 2018-112992 | A | 7/2018 |
| JP | 2019-071126 | A | 5/2019 |
| KR | 2010-0130832 | A | 12/2010 |
| WO | 2018/061812 | A1 | 4/2018 |
| WO | 2019/147120 | A1 | 8/2019 |

OTHER PUBLICATIONS

JP Office Action for JP Application No. 2024-188859, mailed on Apr. 1, 2025 with English Translation.
EP Office Communication for EP Application No. 20912569.9, mailed on Feb. 21, 2025.
International Search Report for PCT Application No. PCT/JP2020/000186, mailed on Mar. 17, 2020.
Written opinion for PCT Application No. PCT/JP2020/000186, mailed on Mar. 17, 2020.
Ministry of Foreign Affairs of Japan, "Measures for Safety of IC Passports" described in https://www.mofa.go.jp/mofaj/toko/passport/ic_faq.html#11, 2014.
JP Office Action for JP Application No. 2023-120530, mailed on Apr. 24, 2024 with English Translation.
Office action dated Nov. 22, 2023 of U.S. Appl. No. 17/788,878.
Office action dated Apr. 11, 2024 of U.S. Appl. No. 17/788,878.
Notice of Allowance dated Jun. 3, 2024 of U.S. Appl. No. 17/788,878.

* cited by examiner

FIG. 4

GATE USER DATABASE

| BIOLOGICAL INFORMATION | MRZ INFORMATION |
|---|---|
| FV1 | MRZ01 |
| FV2 | MRZ02 |
| FV3 | MRZ03 |
| ⋮ | ⋮ |

GATE APPARATUS, SERVER APPARATUS, EMIGRATION AND IMMIGRATION EXAMINATION SYSTEM, CONTROL METHOD OF GATE APPARATUS, AND CONTROL METHOD OF SERVER APPARATUS

This application is a Continuation of U.S. application Ser. No. 17/788,878 filed on Jun. 24, 2022, which is a National Stage Entry of PCT/JP2020/000186 filed on Jan. 7, 2020, the contents of all of which are incorporated herein by reference, in their entirety.

TECHNICAL FIELD

The present invention relates to a gate apparatus, a server apparatus, an emigration and immigration examination system, a gate apparatus control method, and a server apparatus control method.

BACKGROUND ART

Emigration and immigration examination is performed at airports. An officer in charge of the emigration and immigration examination compares a photograph of a face attached to a passport and the face of a person in front of the officer. If the face image in the passport matches the face of the person in front of the officer, the emigration and immigration of the person is permitted.

In addition, in recent years, apparatuses that automatically perform the above emigration and immigration examination have been introduced. For example, a gate apparatus disclosed in PTL 1 performs matching between a face image attached to a passport and a face image of a person standing in front of the gate apparatus and examines emigration and immigration of the person based on the result of the matching.

CITATION LIST

Patent Literature

[PTL 1] Japanese Unexamined Patent Application Publication No. 2019-071126

SUMMARY OF INVENTION

Technical Problem

When the gate apparatus disclosed in PTL 1 is used, a user opens his or her passport to a page including a face image and places the page on a passport reader (a scanner) of the gate apparatus. This gate apparatus acquires data necessary for the above matching (1-to-1 matching) from the passport reader (for example, see paragraph [0035] in PTL 1).

To use the gate apparatus disclosed in PTL 1, a user needs to stand in front of the gate apparatus, open his or her passport, and have the gate apparatus to read information on the opened page via the passport reader. However, if the user is made to perform this operation, the significance of automatically performing the emigration and immigration examination is lost. That is, the gate apparatus disclosed in PTL 1 cannot allow its users to smoothly complete the emigration and immigration examination without stress.

The present invention contributes to realization of smooth emigration and immigration examination, and it is a principal object of the present invention to provide a gate apparatus, a server apparatus, an emigration and immigration examination system, a control method of a gate apparatus, and a control method of a server apparatus.

Solution to Problem

According to a first aspect of the present invention, there is provided a gate apparatus including: an acquisition unit that acquires biological information about an examination target user; a matching request unit that requests a server apparatus that stores biological information about users and MRZ (Machine Readable Zone) information written in machine readable zones in passports issued to the users in association with each other to perform matching on the biological information about the examination target user; and a control unit that controls a gate so that the examination target user can pass through the gate if information is successfully read out from an IC (Integrated Circuit) chip in a passport issued to the examination target user by using MRZ information determined by the matching.

According to a second aspect of the present invention, there is provided a server apparatus including: a storage unit that stores, as gate user information, biological information about users and MRZ (Machine Readable Zone) information written in machine readable zones in passports issued to the users in association with each other; a matching unit that searches the gate user information by using biological information about an examination target user, the biological information having been received from a gate apparatus that controls a gate based on an emigration and immigration examination result of a user, and determines the MRZ information corresponding to the received biological information; and a communication control unit that transmits the determined MRZ information to the gate apparatus.

According to a third aspect of the present invention, there is provided an emigration and immigration examination system including: a server apparatus that stores, as gate user information, biological information about users and MRZ (Machine Readable Zone) information written in machine readable zones in passports issued to the users in association with each other; and a gate apparatus that controls a gate based on an emigration and immigration examination result of a user, wherein the gate apparatus acquires biological information about an examination target user and transmits the biological information about the examination target user to the server apparatus, wherein the server apparatus searches the gate user information to determine the MRZ information corresponding to the received biological information and transmits the determined MRZ information to the gate apparatus, and wherein, the gate apparatus controls the gate so that the examination target user can pass through the gate if information is successfully read out from an IC (Integrated Circuit) chip in a passport issued to the examination target user by using the received MRZ information.

According to a fourth aspect of the present invention, there is provided a control method of a gate apparatus including: acquiring biological information about an examination target user; requesting a server apparatus that stores biological information about users and MRZ (Machine Readable Zone) information written in machine readable zones in passports issued to the users in association with each other to perform matching on the biological information about the examination target user; and controlling a gate so that the examination target user can pass through the gate if information is successfully read out from an IC (Integrated Circuit) chip in a passport issued to the examination target user by using MRZ information determined by the matching.

According to a fifth aspect of the present invention, there is provided a control method of a server apparatus including a storage unit that stores, as gate user information, biological information about users and MRZ (Machine Readable Zone) information written in machine readable zones in passports issued to the users in association with each other, the control method of the server including: searching the gate user information by using biological information about an examination target user, the biological information having been received from a gate apparatus that controls a gate based on an emigration and immigration examination result of a user, and to determine the MRZ information corresponding to the received biological information; and transmitting the determined MRZ information to the gate apparatus.

Advantageous Effects of Invention

The individual aspects of the present invention provide a gate apparatus, a server apparatus, an emigration and immigration examination system, a control method of a gate apparatus, and a control method of a server apparatus that contribute to realization of smooth emigration and immigration examination. The advantageous effects of the present invention are not limited to the above advantageous effect. The present invention may provide other advantageous effects, instead of or in addition to the above advantageous effect.

BRIEF DESCRIPTION OF THE DRAWINGS

FIG. 4 is a diagram illustrating an example of a gate user database.

EXAMPLE EMBODIMENT

Figure 1:
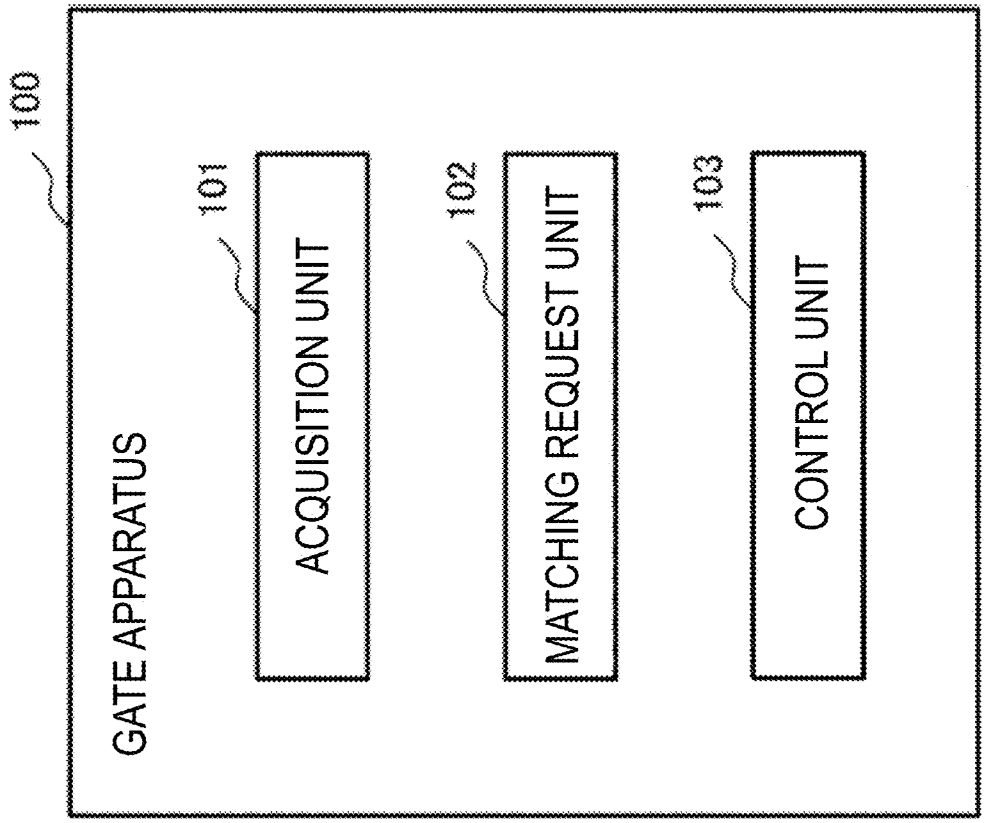
FIG. 1 is a diagram illustrating an outline of an example embodiment.

First, an outline of an example embodiment will be described. In the following outline, various components are denoted by reference characters for the sake of convenience. That is, the following reference characters are used as examples to facilitate the understanding of the present invention. Thus, the description of the outline is not intended to impose any limitations. In addition, unless otherwise specified, an individual block illustrated in the drawings represents a configuration of a functional unit, not a hardware unit. An individual connection line between blocks in the drawings signifies both one-way and two-way directions. An arrow schematically illustrates a principal signal (data) flow and does not exclude bidirectionality. In the present description and drawings, elements that can be described in a like way will be denoted by a like reference character, and redundant description thereof will be omitted as needed.

A gate apparatus 100 according to an example embodiment includes an acquisition unit 101, a matching request unit 102, and a control unit 103 (see FIG. 1). The acquisition unit 101 acquires biological information about an examination target user. The matching request unit 102 requests a server apparatus that stores biological information about users and MRZ (Machine Readable Zone) information written in machine readable zones in passports issued to the users in association with each other to perform matching on the biological information about the examination target user. The control unit 103 controls a gate so that the examination target user can pass through the gate if information is successfully read out from an IC (Integrated Circuit) chip in a passport issued to the examination target user by using MRZ information determined by the matching.

In an emigration and immigration system including the above gate apparatus 100, users who wish to use the system previously register their biological information in the server apparatus. In this way, the users can complete the emigration and immigration examination by bringing their passports into contact with the gate apparatus 100 without opening the passports. As a result, convenient and smooth emigration and immigration examination can be realized for the users.

Hereinafter, specific example embodiments will be described in more detail with reference to the accompanying drawings.

First Example Embodiment

A first example embodiment will be described in more detail with reference to drawings.

Figure 2:
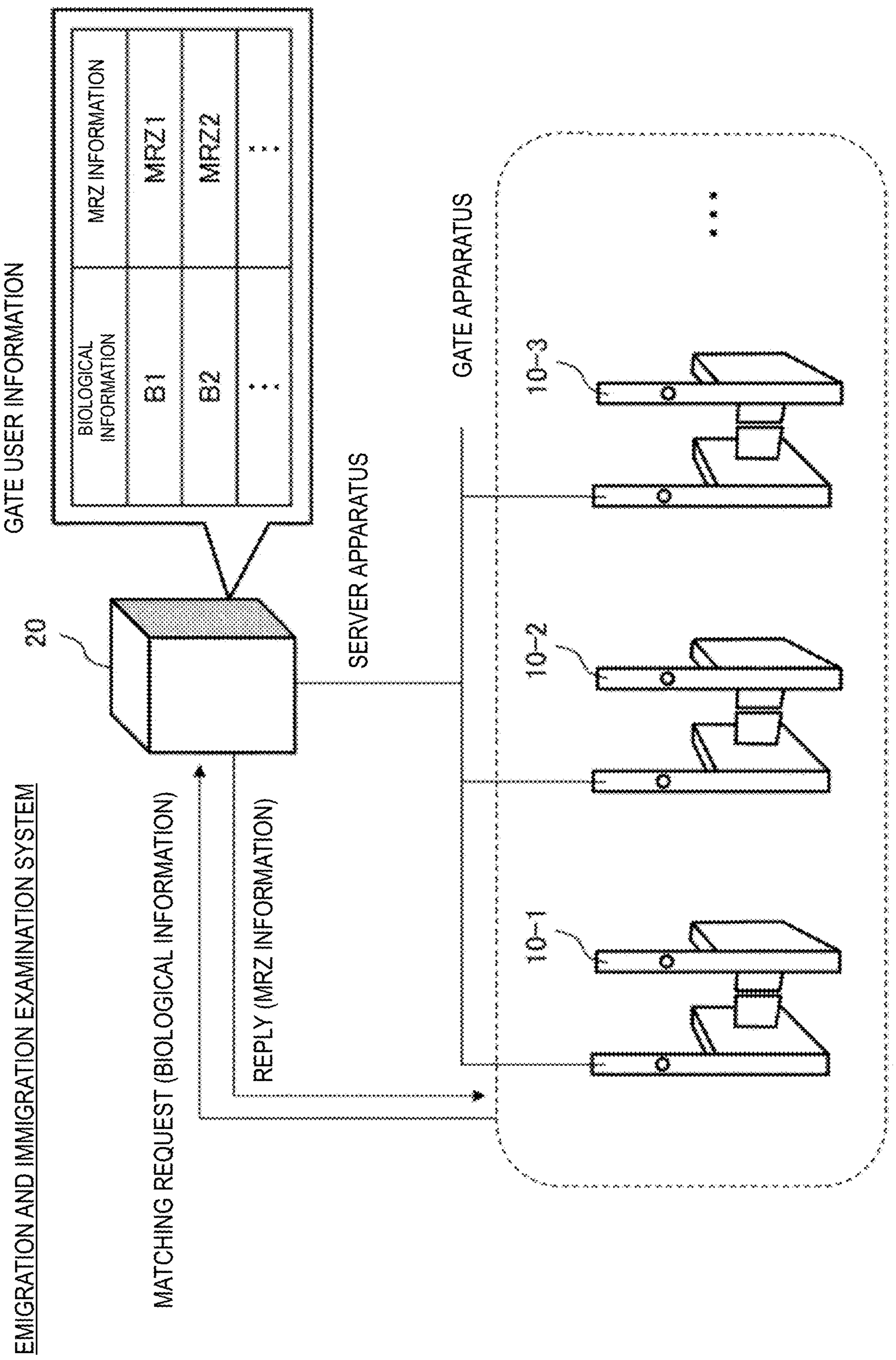
FIG. 2 is a diagram illustrating an example of a schematic configuration of an emigration and immigration examination system according to a first example embodiment.

FIG. 2 is a diagram illustrating an example of a schematic configuration of an emigration and immigration examination system according to the first example embodiment. As illustrated in FIG. 2, the emigration and immigration examination system includes a plurality of gate apparatuses 10-1 to 10-3 and a server apparatus 20. In the following description, unless there is a particular reason to distinguish the gate apparatuses 10-1 to 10-3 from each other, any one of these gate apparatuses 10-1 to 10-3 will simply be referred to as a “gate apparatus 10”. In addition, while three gate apparatuses 10 are illustrated in FIG. 2, the number of gate apparatuses 10 included in the system is not of course limited to any particular number. The emigration and immigration examination system includes at least one gate apparatus 10.

The individual gate apparatus 10 is an apparatus that automatically performs an emigration and immigration examination procedure for users. The gate apparatus 10 includes a gate that can be opened and closed. If the gate apparatus 10 determines that a person located in front of the gate apparatus 10 possesses a correct passport, the gate apparatus 10 opens the gate and permits the user to pass through the gate. In this way, the gate apparatus 10 controls the gate based on the result of the emigration and immigration examination of the user.

The server apparatus 20 is an apparatus that realizes the emigration and immigration examination based on the above gate apparatus 10. For example, the server apparatus 20 stores information about users who can use the gate apparatus 10 (the information will hereinafter be referred to as gate user information). Specifically, the server apparatus 20 stores biological information about users and information written in Machine Readable Zones (MRZs) in passports issued to the users (the information will hereinafter be referred to as MRZ information) in association with each other.

For example, the biological information about a user is data (feature values) calculated from physical features unique to this individual user. The physical features are about the face, a fingerprint, a voiceprint, a vein, a retina, or an iris pattern of an eye of the user. Alternatively, the biological information about a user may be, for example, image data of a face image or a fingerprint image of the user. Any information including physical features of a user may be used as the biological information about the user.

The information (MRZ information) written in an MRZ in a passport includes the name, the nationality, the gender, the date of birth of the user, the passport number, the validity period, etc.

The gate apparatuses 10 and the server apparatus 20 can communicate with each other via wired or wireless communication means. The server apparatus 20 may be placed in the same airport where the gate apparatuses 10 are placed. Alternatively, the server apparatus 20 may be placed on a network (cloud).

[Schematic Operation in Emigration and Immigration Examination System]

Next, a schematic operation in the emigration and immigration examination system according to the first example embodiment will be described with reference to FIG. 2.

The gate user information about a user of the emigration and immigration examination system is registered in the server apparatus 20, for example, before departure of the user. That is, the gate user information about a user is registered in the server apparatus 20 before his or her departure date or before departure on his or her departure date. The server apparatus 20 includes a database for storing the gate user information, and after a user registers his or her gate user information, an entry corresponding to this user is added in the database. Hereinafter, the database for storing the gate user information will be referred to as a "gate user database". In the gate user database, biological information about at least one user and MRZ information written in a machine readable zone in the passport issued to the at least one user are stored in association with each other.

A user visits the airport on the departure data (the airport where the gate apparatuses 10 are installed). After the user completes boarding procedures such as a check-in procedure and a security check procedure, the user moves to an area (an emigration and immigration examination area) where the gate apparatuses 10 are installed.

When the user arrives at the emigration and immigration examination area, the user moves to a gate apparatus 10.

When the user comes close to the gate apparatus 10 (when the distance between the user and the gate apparatus 10 reaches a predetermined distance or less), the gate apparatus 10 acquires (generates) biological information from the user. The biological information acquired by the gate apparatus 10 is the same kind of information as the biological information registered as the gate user information in the server apparatus 20.

The gate apparatus 10 transmits the acquired biological information to the server apparatus 20. More specifically, the gate apparatus 10 transmits a "matching request" including the acquired biological information to the server apparatus 20.

The server apparatus 20 searches the gate user database by using the received biological information as a key and determines the MRZ information corresponding to the received biological information. The server apparatus 20 transmits a reply (a reply to the matching request) including the determined MRZ information to the gate apparatus 10.

When the user arrives at the gate apparatus 10, the user holds his or her passport on a reader (a reader 316 to be described below) of the gate apparatus 10 (brings his or her passport into contact with a reader). That is, the user brings his or her passport into contact with a reader of the gate apparatus 10 in the same way as people bring their transportation IC cards into contact with card readers at ticket gates in stations.

The gate apparatus 10 attempts to read out information written in an IC chip in the passport via the reader. If the gate apparatus 10 succeeds in reading out the information written in the IC chip by using the MRZ information acquired from the server apparatus 20, the gate apparatus 10 determines that the user possesses a correct passport and opens the gate.

The user passes through the gate, and the emigration and immigration examination ends.

As described above, in the emigration and immigration examination system according to the first example embodiment, the gate user information is previously registered in the server apparatus 20. In this way, the users can pass through the gate by bringing their passports into contact with the reader without opening their passports.

Next, the individual apparatuses included in the emigration and immigration examination system according to the first example embodiment will be described in detail. The following description will be made based on an example in which information about faces of people are used as the biological information registered in the server apparatus 20.

[Server Apparatus]

Figure 3:
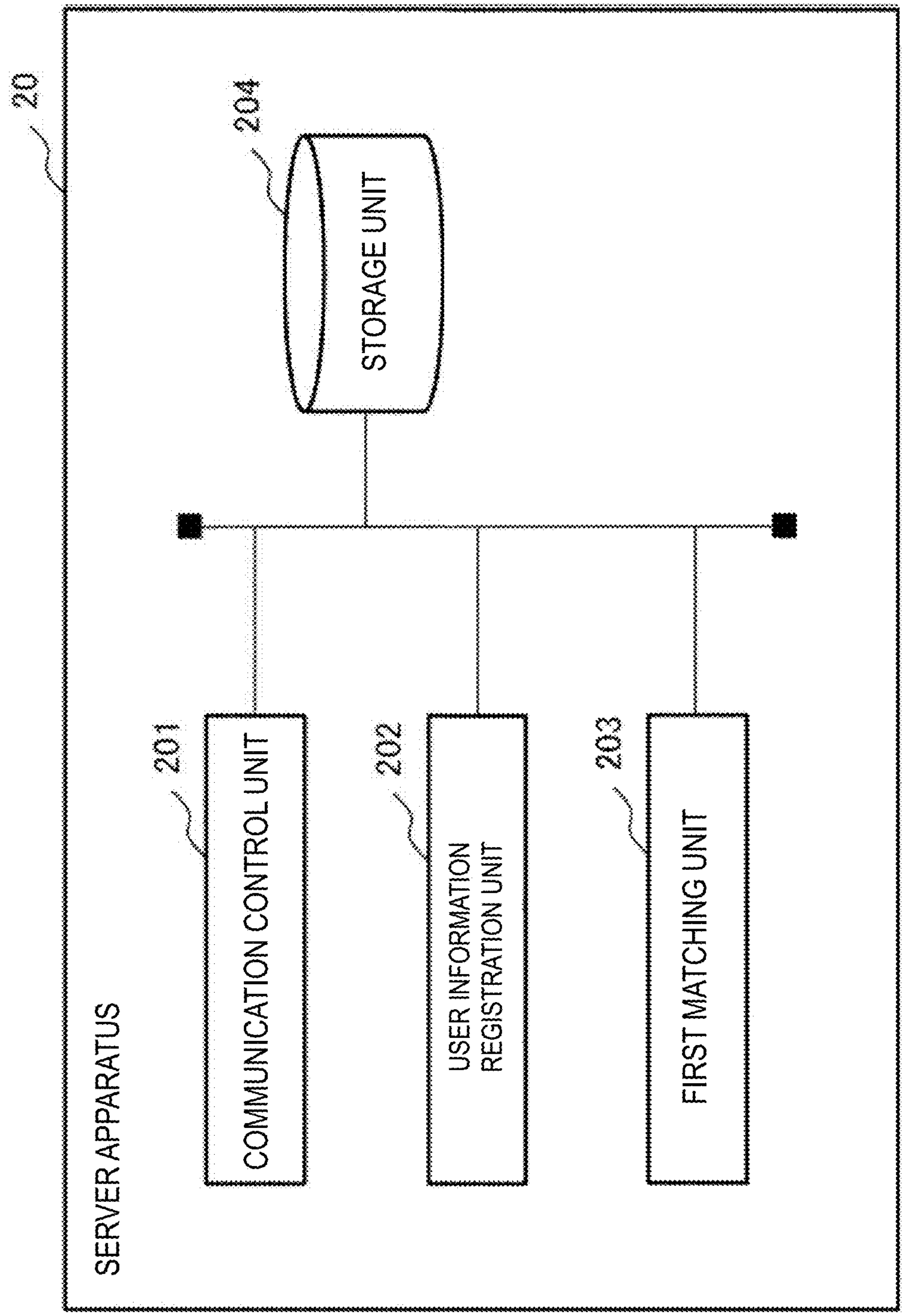
FIG. 3 is a diagram illustrating an example of a processing configuration of a server apparatus according to the first example embodiment.

FIG. 3 is a diagram for illustrating an example of a processing configuration (processing modules) of the server apparatus 20 according to the first example embodiment. As illustrated in FIG. 3, the server apparatus 20 includes a communication control unit 201, a user information registration unit 202, a first matching unit 203, and a storage unit 204.

The communication control unit 201 is means for controlling communication with other apparatuses. Specifically, the communication control unit 201 receives data (packets) from the gate apparatuses 10. In addition, the communication control unit 201 transmits data to the gate apparatuses 10.

The user information registration unit 202 is means for acquiring gate user information and registering the acquired gate user information in the gate user database established in the storage unit 204. The user information registration unit 202 can use any method to acquire the gate user information.

For example, an officer in charge at a passport center may register gate user information in the server apparatus 20. Specifically, an officer in charge operates a scanner and reads out a photograph of a face and a page including an MRZ in a passport. The officer in charge operates a terminal (a computer installed at the passport center) and transmits the read data (image data) to the server apparatus 20. Alternatively, the above data may be input to the server apparatus 20 via an external storage device, such as a USB (Universal Serial Bus) memory.

The above data (image data including the photograph of the face and the MRZ) may be input to the server apparatus 20 during a check-in procedure at the airport. Specifically, when an airline company staff member checks the passport of the user, the staff member reads out the photograph of the face and the page including the MRZ by using a scanner. The airline company staff member may transmit the read data from a terminal to the server apparatus 20.

Alternatively, the user may use a so-called automatic check-in machine, to read the photograph of the face and the page including the MRZ by himself or herself. In this case, the data read from the automatic check-in machine is transmitted to the server apparatus 20.

The user may capture the photograph of the face and the page including the MRZ in the passport, to acquire image data including the photograph of the face and the MRZ. Specifically, the user uses a smartphone or the like to capture the photograph of the face and the page including the MRZ in the passport. Next, the captured image data is transmitted from the smartphone or the like to the server apparatus 20.

Alternatively, the image data including the photograph of the face and the MRZ may be acquired from a database in which records of the users who have been abroad are stored. Specifically, if the photograph of the face and the MRZ have previously been acquired at a staffed emigration and immigration booth and registered in a database, the corresponding image data may be transmitted from the database to the server apparatus 20.

The user information registration unit 202 may use any one of the above-described methods or a different method, to acquire the image data including the photograph of the face and the MRZ included in the passport of the user.

The user information registration unit 202 extracts feature points from the face image included in the acquired image data. Since an existing technique can be used to extract these feature points, detailed description of the extraction will be omitted. For example, the user information registration unit 202 extracts the eyes, nose, mouth, etc. as feature points from the face image. Next, the user information registration unit 202 calculates, as feature values, the location of the individual feature point and the distance between feature points and generates a feature vector formed by a plurality of feature values (vector information that features the face image).

The user information registration unit 202 extracts the MRZ information from the image data including the MRZ information. Specifically, the user information registration unit 201 uses an optical character recognition (OCR) technique to extract the MRZ information from the image data.

The user information registration unit 202 associates the generated feature vector and the extracted MRZ information with each other and registers the associated information in the gate user database.

FIG. 4 is a diagram illustrating an example of the gate user database. As illustrated in FIG. 4, the feature vectors generated from face images are registered as biological information. In addition, MRZ information corresponding to the individual biological information (feature vectors) is registered in the gate user database.

The first matching unit 203 is means for processing matching requests transmitted by the gate apparatuses 10. Specifically, the first matching unit 203 sets the biological information (the feature vector) included in a matching request as the matching target and performs matching processing between this biological information and the biological information registered in the gate user database.

More specifically, the first matching unit 203 sets a feature vector extracted from a matching request as the matching target and performs 1-to-N matching (N will hereinafter represents a positive integer) between this feature vector and the plurality of feature vectors registered in the gate user database.

The first matching unit 203 calculates a similarity between the feature vector as the matching target and each of the plurality of feature vectors registered. For this similarity, the chi-squared distance, the Euclidean distance, or the like may be used. A large distance represents a lower similarity, and a smaller distance represents a higher similarity.

The first matching unit 203 searches the plurality of feature vectors registered in the gate user database for a feature vector whose similarity to the matching target feature vector is more than or equal to a predetermined value and whose similarity is the highest.

The first matching unit 203 reads out the MRZ information corresponding to the feature vector (biological information) obtained as a result of the 1-to-N matching from the gate user database. The first matching unit 203 transmits the read MRZ information to the gate apparatus 10 that has transmitted the matching request (replies to the matching request).

For example, in the example in FIG. 4, if the similarity between a feature vector FV acquired from a gate apparatus 10 and a feature vector FV1 stored in the gate user database is the highest and if the similarity is more than or equal to a predetermined value, MRZ01 corresponding to this feature vector FV1 is transmitted to the gate apparatus 10.

If, as a result of the above 1-to-N matching, the biological information that matches (substantially matches or is substantially similar to) the biological information included in the matching request is not registered in the gate user database, the first matching unit 203 notifies the gate apparatus 10 to that effect. For example, the first matching unit 203 sets “None” in the feature vector and transmits a reply to the gate apparatus 10.

Alternatively, the first matching unit 203 may notify the gate apparatus 10 that the biological information included in the matching request is not included in the gate user database by not transmitting any reply to the gate apparatus 10. In this case, the gate apparatus 10 that has transmitted the matching request recognizes that the biological information included in the matching request is not included in the gate user database by not receiving any reply from the server apparatus 20 within a predetermined period.

The storage unit 204 stores various kinds of information necessary for operations of the server apparatus 20. In addition, as described above, the gate user database is established in the storage unit 204.

Figure 5:
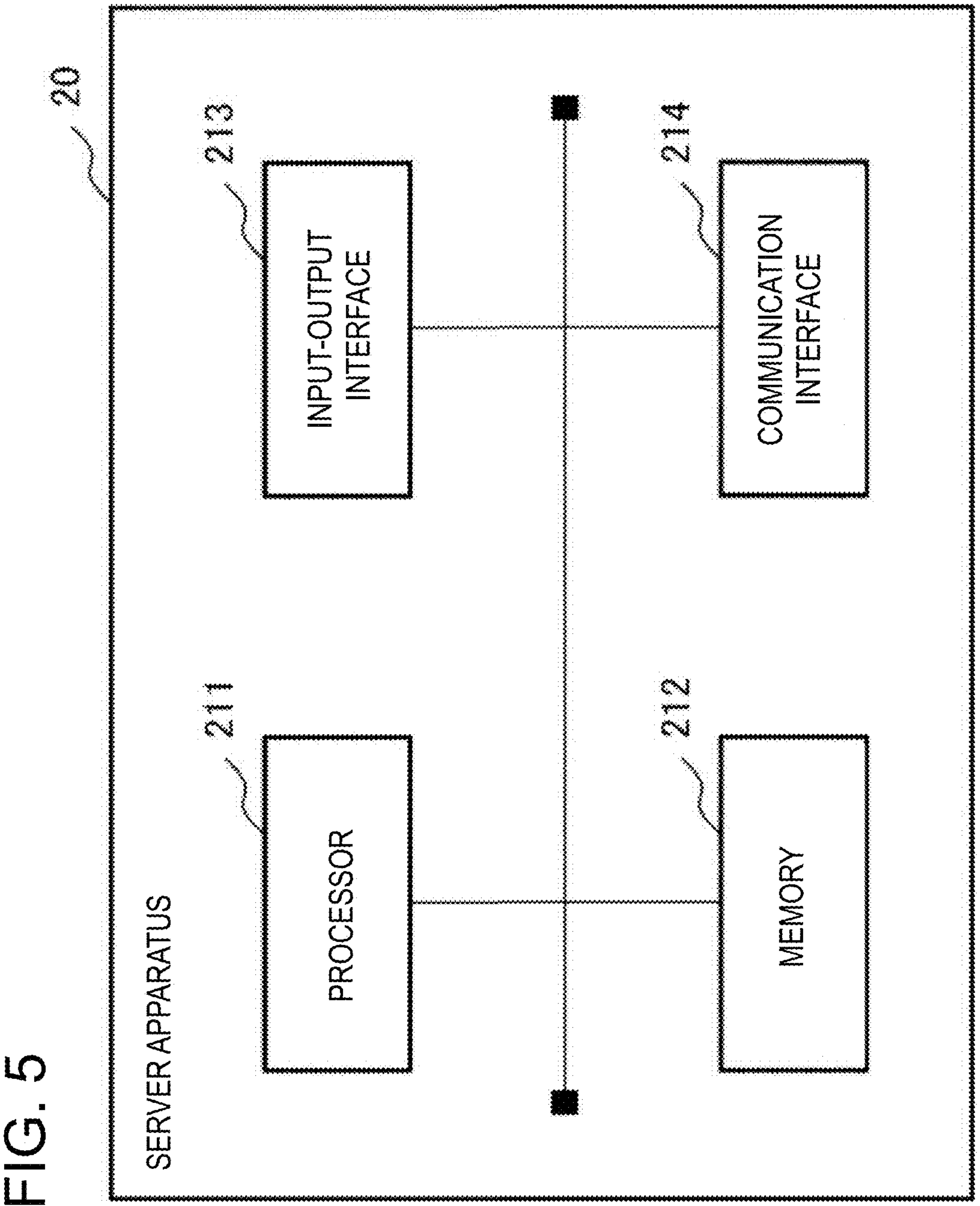
FIG. 5 is a diagram illustrating an example of a hardware configuration of the server apparatus according to the first example embodiment.

FIG. 5 is a diagram illustrating an example of a hardware configuration of the server apparatus 20 according to the first example embodiment. The server apparatus 20 can be configured by an information processing apparatus (a so-called computer) and has a configuration illustrated as an example in FIG. 5. For example, the server apparatus 20 includes a processor 211, a memory 212, an input-output interface 213, a communication interface 214, etc. The components such as the processor 211 are connected to an internal bus, etc. so that these components can communicate with each other.

The hardware configuration of the server apparatus 20 is not limited to the configuration illustrated in FIG. 5. The server apparatus 20 may include hardware not illustrated or may be configured without the input-output interface 213 if desired. In addition, the number of components, such as the number of processors 211, included in the server apparatus 20 is not limited to the example illustrated in FIG. 5. For example, a plurality of processors 211 may be included in the server apparatus 20.

For example, the processor 211 is a programmable device such as a CPU (Central Processing Unit), an MPU (Micro Processing Unit), or a DSP (Digital Signal Processor). Alternatively, the processor 211 may be a device such as an FPGA (Field Programmable Gate Array) or an ASIC (Application Specific Integrated Circuit). The processor 211 executes various kinds of programs including an operating system (OS).

The memory 212 is a RAM (Random Access Memory), a ROM (Read-Only Memory), an HDD (Hard Disk Drive), an SSD (Solid State Drive), or the like. The memory 212 stores an OS program, an application program, and various kinds of data.

The input-output interface 213 is an interface for a display apparatus and an input apparatus not illustrated. For example, the display apparatus is a liquid crystal display or the like. For example, the input apparatus is an apparatus, such as a keyboard or a mouse, which receives user operations.

The communication interface 214 is a circuit, a module, or the like for performing communication with other apparatuses. For example, the communication interface 214 includes a NIC (Network Interface Card) or the like.

The functions of the server apparatus 20 are realized by various kinds of processing modules. The processing modules are realized, for example, by causing the processor 211 to execute a program stored in the memory 212. In addition, this program can be recorded in a computer-readable storage medium. The storage medium may be a non-transient (non-transitory) storage medium, such as a semiconductor memory, a hard disk, a magnetic recording medium, or an optical recording medium. That is, the present invention can be embodied as a computer program product. In addition, the above program may be updated by downloading a program via a network or by using a storage medium in which a program is stored. In addition, the above processing modules may be realized by semiconductor chips.

[Gate Apparatus]

Next, the gate apparatus 10 according to the first example embodiment will be described.

Figure 6:
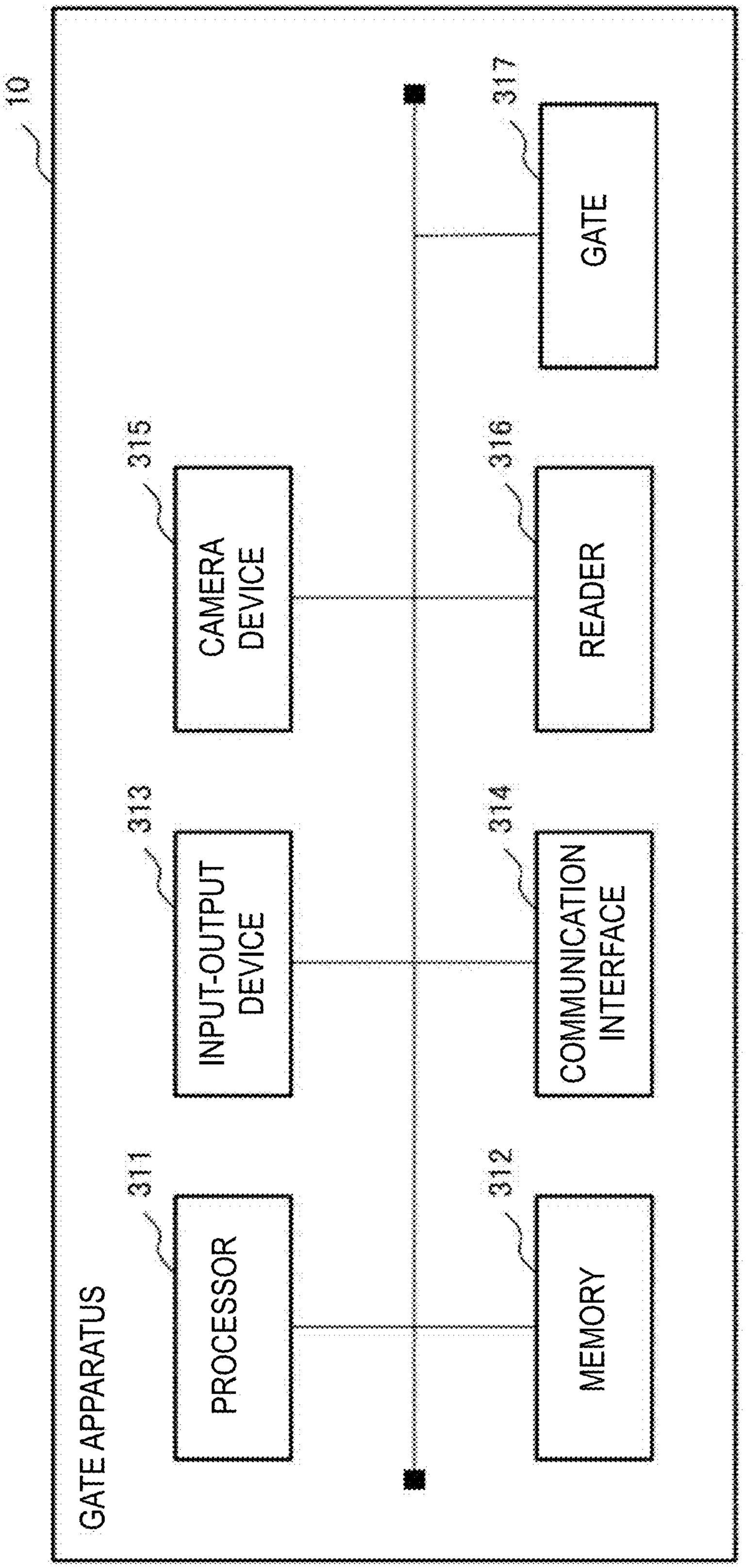
FIG. 6 is a diagram illustrating an example of a hardware configuration of a gate apparatus according to the first example embodiment.

FIG. 6 is a diagram illustrating an example of a hardware configuration of the gate apparatus 10 according to the first example embodiment. As illustrated in FIG. 6, the gate apparatus 10 includes a processor 311, a memory 312, an input-output device 313, a communication interface 314, a camera device 315, a reader 316, and a gate 317.

Since the processor 311, the memory 312, and the communication interface 314 may be equivalent to those of the server apparatus 20 described with reference to FIG. 5, detailed description thereof will be omitted.

The input-output device 313 serves as a device (for example, a touch panel) for inputting information to the gate apparatus 10 and a device (for example, a liquid crystal monitor) for outputting information.

For example, the camera device 315 is a digital camera installed to capture an image of a person in front of (in the forward direction of) the gate apparatus 10. The camera device 315 may be installed at any location. For example, the camera device 315 may be installed on the main body of the gate apparatus 10 or away from the gate apparatus 10. As long as the camera device 10 can capture an image of a user approaching the gate apparatus 10 (in particular, the face of the user), the camera device 10 may be installed at any location.

The reader 316 is a device that reads out information from passports. The reader 316 has a function of accessing IC chips in passports and a function of scanning pages of passports placed. That is, the reader 316 has a function as a card reader that exchanges information (data) with IC chips in passports in a non-contact state and has a function as a passport reader (a scanner) that acquires images from passports. The reader 316 may be installed at any location. However, it is preferable that the reader 316 be installed at a location where users can easily bring their passports into contact with this reader 316. While the present application will be described assuming that the reader 316 has a function as a card reader and a function as a passport reader, these two functions may be of course realized by different devices.

When a user passes the emigration and immigration examination, the gate 317 shifts from a closed state in which the gate 317 blocks passage of the user to an opened state in which passage of the user is permitted. The mechanism of the gate 317 is not limited to any particular mechanism. For example, the gate 317 is a flap gate that opens and closes a flap installed on one side or flaps installed on both sides of the passage or is a turnstile gate that rotate three bars.

Figure 7:
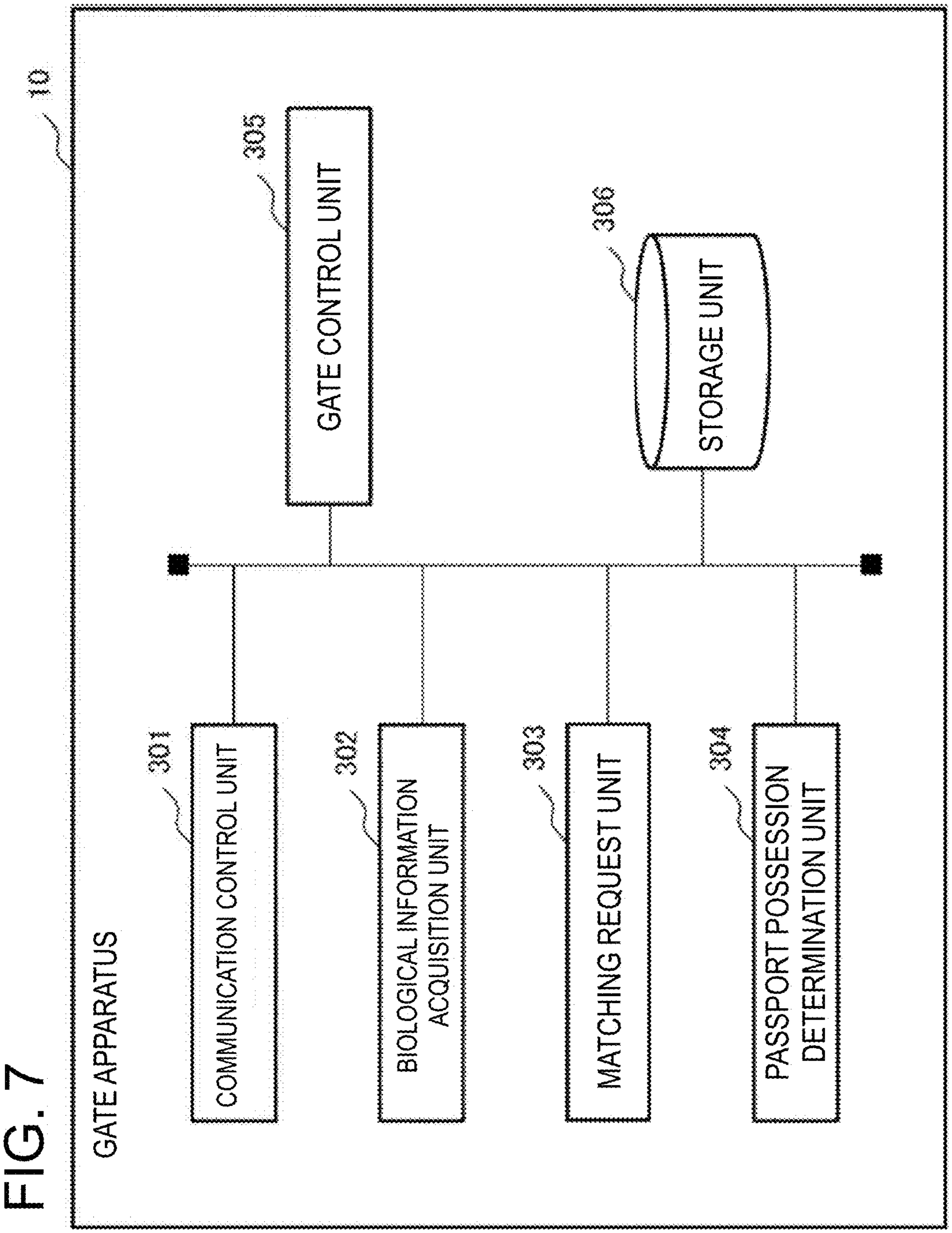
FIG. 7 is a diagram illustrating an example of a processing configuration of the gate apparatus according to the first example embodiment.

FIG. 7 is a diagram illustrating an example of a processing configuration (processing modules) of the gate apparatus 10 according to the first example embodiment. As illustrated in FIG. 7, the gate apparatus 10 includes a communication control unit 301, a biological information acquisition unit 302, a matching request unit 303, a passport possession determination unit 304, a gate control unit 305, and a storage unit 306.

As with the communication control unit 201 of the server apparatus 20, the communication control unit 301 is means for controlling communication with other apparatuses.

The biological information acquisition unit 302 is means for acquiring biological information about users who wish to pass through the gate apparatus 10. For example, the biological information acquisition unit 302 controls the camera device 315 and acquires a face image of a person walking toward the camera device 315 (the gate apparatus 10). For example, when the biological information acquisition unit 302 detects a user's face in an image being constantly or regularly captured, the biological information acquisition unit 302 captures the user's face and acquires the image of the face.

If the size of the face area included in the captured image is more than or equal to a predetermined value, the biological information acquisition unit 302 may extract the face area from the image. In this case, by appropriately adjusting the predetermined value (a threshold), the biological information acquisition unit 302 can acquire the face image of the user at a location a predetermined distance away from the gate apparatus 10. That is, it is possible to prevent capturing an image of the user at a location far away from the gate apparatus 10 and prevent transmitting biological information inappropriate for face authentication (1-to-1 matching by the server apparatus 20) to the server apparatus 20.

Alternatively, the biological information acquisition unit 302 may measure the distance between the gate terminal 10 and a user by using a distance sensor or the like and may acquire a face image of a user at a predetermined location.

The biological information acquisition unit 302 gives the acquired face image to the matching request unit 303.

The matching request unit 303 is means for requesting the server apparatus 20 to perform matching to determine whether the biological information about the person corresponding to the acquired face image is registered in the gate user database. Specifically, the matching request unit 303 calculates feature values from the acquire face image and generates a feature vector from the plurality of feature values (generates a feature vector corresponding to the biological information registered in the server apparatus 20).

The matching request unit 303 generates a matching request including the generated feature vector (biological information) and transmits the matching request to the server apparatus 20.

Figure 8:
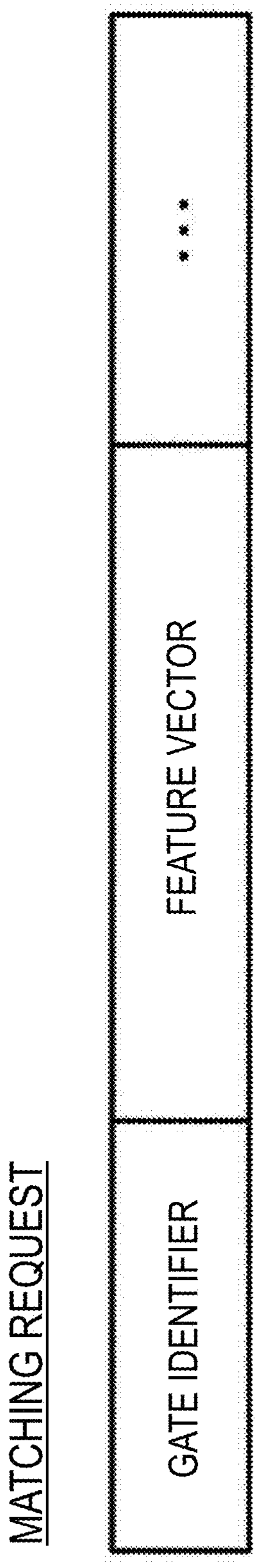
FIG. 8 is a diagram illustrating an example of a matching request.

For example, the matching request unit 303 generates a matching request including an identifier of the corresponding gate apparatus 10 (hereinafter referred to as a gate identifier), a feature vector, etc. (see FIG. 8). A MAC (Media Access Control) address or an IP (Internet Protocol) address of the gate apparatus 10 may be used as the gate identifier.

The matching request unit 303 receives a reply to the matching request from the server apparatus 20. The matching request unit 303 gives the reply (MRZ information corresponding to the feature vector determined by the 1-to-N matching) from the server apparatus 20 to the passport possession determination unit 304.

The passport possession determination unit 304 is means for determining whether the user who wishes to pass through the gate apparatus 10 possesses a correct passport. Specifically, the passport possession determination unit 304 attempts to read out information from an IC chip in the passport held over the reader 316 by using the MRZ information acquired from the matching request unit 303.

As described in "Measures for Safety of IC Passports" in the following reference document 1, information stored in an IC chip in a passport is encrypted (converted) by using MRZ information written in the same passport as a password.

Reference Document 1 https://www.mofa.go.jp/mofaj/toko/passport/ic_faq.html#11

If the passport possession determination unit 304 succeeds in reading out information from the IC chip by using the MRZ information acquired from the server apparatus 20 (succeeds in decrypting the information), the passport possession determination unit 304 determines that the user who wishes to pass through the gate apparatus 10 possesses a correct passport.

In contrast, if the passport possession determination unit 304 fails to read out information from the IC chip by using the acquired MRZ information from the server apparatus 20, the passport possession determination unit 304 determines that the user who wishes to pass through the gate apparatus 10 does not possess a correct passport.

In this way, if the passport possession determination unit 304 succeeds in reading out information from the IC chip by using the MRZ information (succeeds in decrypting the encrypted information), the passport possession determination unit 304 determines that the user possesses a correct passport. Thus, the passport possession determination unit 304 may check or may not check the content of the information read out from the IC chip.

If the passport possession determination unit 304 determines that the user who wishes to pass through the gate apparatus 10 possesses a correct passport, the passport possession determination unit 304 instructs the gate control unit 305 to "open the gate".

If the passport possession determination unit 304 determines that the user who wishes to pass through the gate apparatus 10 does not possess a correct passport, the passport possession determination unit 304 does not perform any particular operation. That is, if the passport possession determination unit 304 determines that the user who wishes to pass through the gate apparatus 10 does not possess a correct passport, the gate 317 does not open the gate.

The gate control unit 305 is means for controlling the gate 317 of the gate apparatus 10. Specifically, the gate control unit 305 controls opening and closing of the gate 317 in accordance with an instruction from the passport possession determination unit 304. If the gate control unit 305 determines, by using a distance sensor or the like, that a user who possesses a correct passport and who is permitted to pass through the gate 317 has passed through the gate 317, the gate control unit 305 closes the gate 317.

[Operation in Emigration and Immigration Examination System]

Next, an operation in the emigration and immigration examination system according to the first example embodiment will be described.

Figure 9:
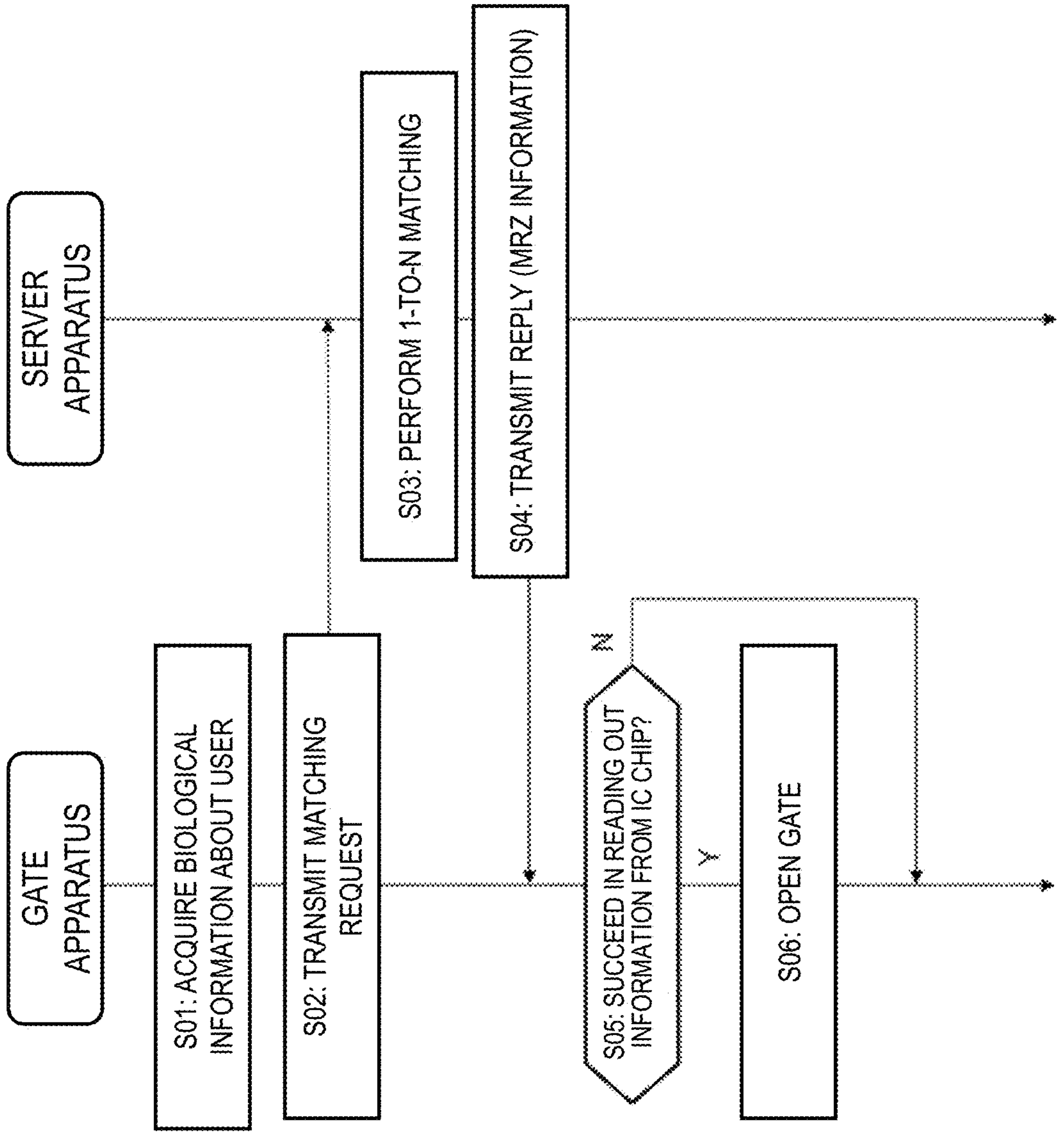
FIG. 9 is a sequence diagram for illustrating an example of an operation of an emigration and immigration system according to a first example embodiment.

FIG. 9 is a sequence diagram illustrating an example of an operation in an emigration and immigration system according to the first example embodiment. FIG. 9 is a sequence diagram illustrating an example of a system operation on the departure date of a user. The following description assumes that, prior to this operation in FIG. 9, the "gate user information" about the user is previously registered in the server apparatus 20.

When a user approaches the gate apparatus 10, the gate apparatus 10 acquires biological information from the user (step S01). For example, the gate apparatus 10 acquires a face image of the user.

When the gate apparatus 10 successfully acquires a face image, the gate apparatus 10 transmits a matching request including the biological information about the user to the server apparatus 20 (step S02). Specifically, the gate apparatus 10 calculates a feature vector from the face image and transmits a matching request including the calculated feature vector to the server apparatus 20.

Upon acquiring the matching request, the server apparatus 20 extracts the biological information (the feature vector) from the matching request and performs 1-to-N matching between the feature vector and the biological information registered in the gate user database (step S03). The server apparatus 20 searches the plurality of items of biological information registered in the gate user database for biological information whose similarity to the biological information acquired from the gate apparatus 10 is the highest and whose similarity is more than or equal to a predetermined value.

The server apparatus 20 transmits a reply including the MRZ information determined as a result of the above 1-to-N matching to the gate apparatus 10 (the gate apparatus 10 that has transmitted the matching request) (step S04).

The gate apparatus 10 attempts to read out information from an IC chip in the passport held over the reader 316 by using the received MRZ information (step S05). If the gate apparatus 10 fails to read out information from the IC chip (No in step S05), the gate apparatus 10 performs no particular processing. In this case, the gate apparatus 10 maintains the gate 317 in its closed state.

If the gate apparatus 10 succeeds in reading out information from the IC chip (Yes in step S05), the gate apparatus 10 opens the gate 317 (step S06).

As described above, the gate apparatus 10 acquires biological information about an examination target user and transmits the biological information about the examination target user to the server apparatus 20. The server apparatus 20 searches the gate user information for MRZ information corresponding to the received biological information and transmits the determined MRZ information to the gate apparatus 10. If the gate apparatus 10 succeeds in reading out information from an IC chip in the passport by using the received MRZ information, the gate apparatus 10 controls the gate so that the examination target user can pass through the gate.

The gate apparatus 10 opens the gate 317 only when a user who has previously registered gate user information in the server apparatus 20 presents his or her correct passport to the gate apparatus 10. In other words, in the following case, the gate apparatus 10 does not open the gate 317, and the emigration and immigration examination by the gate apparatus 10 does not end successfully.

For example, if a user who has not registered gate user information in the server apparatus 20 presents his or her own passport to the gate apparatus 10, since corresponding MRZ information cannot be acquired from the server apparatus 20, the gate 317 does not open. In this case, the gate apparatus 10 may display a relevant message (a message indicating that necessary information is not registered in the server apparatus), requesting the user to move to a manned emigration and immigration examination place.

Even if a user has registered gate user information in the server apparatus 20, if the user tries to pass through the gate 317 without bringing his or her passport into contact with the reader 316 of the gate apparatus 10, the gate 317 does not open. This is because the gate apparatus 10 is an apparatus that automatically performs the emigration and immigration examination and has an important function of checking whether the users possess correct passports. That is, even if a user has previously registered gate user information in the server apparatus 20, unless the user's possession of a passport in which the gate user information is registered is not confirmed, the gate 317 does not open. In this case, for example, the gate apparatus 10 may display a message or output an audio guidance for requesting the user to bring his or her correct passport (his or her own passport) into contact with the reader 316.

In addition, even if a user brings a passport into contact with the reader 316, there are cases in which the gate apparatus 10 cannot read out MRZ information. For example, the gate apparatus 10 may not be able to read out MRZ information when the passport is stored in a case or the like. If this happens, the gate apparatus 10 may display a message requesting the user to extract the passport from the case or the like and to bring the passport into contact with the reader 316. Alternatively, the gate apparatus 10 may display a message requesting the user to open the passport and to bring the passport into contact with the reader 316.

In addition, if a user presents someone else's passport, instead of his or her own passport, to the gate apparatus 10, the gate 317 does not open, either. For example, even if a parent and his or her child have previously registered their gate user information in the server apparatus 20, if the parent presents his or her child's passport to the gate apparatus 10, the gate 317 does not open. In this case, for example, the gate apparatus 10 may display a message or output an audio guidance requesting the user to bring his or her correct passport (his or her own passport) into contact with the reader 316.

As described above, in the emigration and immigration examination system according to the first example embodiment, a user who wishes to use the gate apparatus 10 registers biological information in the server apparatus 20 in advance. After the registration, when the user appears in front of the gate apparatus 10 on the departure date, the gate apparatus 10 acquires biological information about the user and queries the server apparatus 20 about whether the acquired biological information is registered in the server apparatus 20 (requests the server apparatus 20 to perform 1-to-N matching by using the biological information). As a result of the matching, if the gate apparatus 10 determines that the biological information about the user is registered in the server apparatus 20, the gate apparatus 10 determines whether the passport presented by the user is truly the passport of the user. Specifically, the gate apparatus 10 determines whether information can be read out from an IC chip in the passport of the user by using the MRZ information determined as a result of the face authentication by the server apparatus 20. As described above, to extract information from the IC chip, the MRZ information written in the same passport is needed. Thus, the fact that the gate apparatus 10 succeeds in reading information from the IC chip by using the MRZ information indicates that the MRZ information acquired from the server apparatus 20 matches the MRZ information in the passport presented by the user. Based on this matching, the gate apparatus 10 determines that the user in front of the gate apparatus 10 possesses a correct passport and opens the gate (the user passes the emigration and immigration examination). In this way, according to the first example embodiment, if users have previously registered information in the database, these users can complete the emigration and immigration examination by bringing their passports into contact with the gate apparatus 10 without opening their passports. As a result, it is possible to realize convenient and smooth emigration and immigration examination for users.

Second Example Embodiment

Next, a second example embodiment will be described in detail with reference to drawings.

The first example embodiment assumes that there is no inconsistency (incoherence) between biological information and MRZ information in gate user information registered in the server apparatus 20. When an officer of a public agency registers gate user information, it is hard to imagine that the above inconsistency occurs. However, when a user registers gate user information in the server apparatus 20, there is a slight possibility that the above inconsistency occurs.

If the above inconsistency occurs, correct emigration and immigration examination cannot be performed, thereby causing a problem. According to the second example embodiment, more reliable emigration and immigration examination can be realized by causing a gate apparatus 10 to perform matching processing, too.

According to the second example embodiment, the emigration and immigration system may have the same schematic configuration and the server apparatus 20 may have the same processing configuration as those according to the first example embodiment. Thus, description corresponding to FIGS. 2, 3, etc. will be omitted. The following description will be made with a focus on the difference between the first and second example embodiments.

Figure 10:
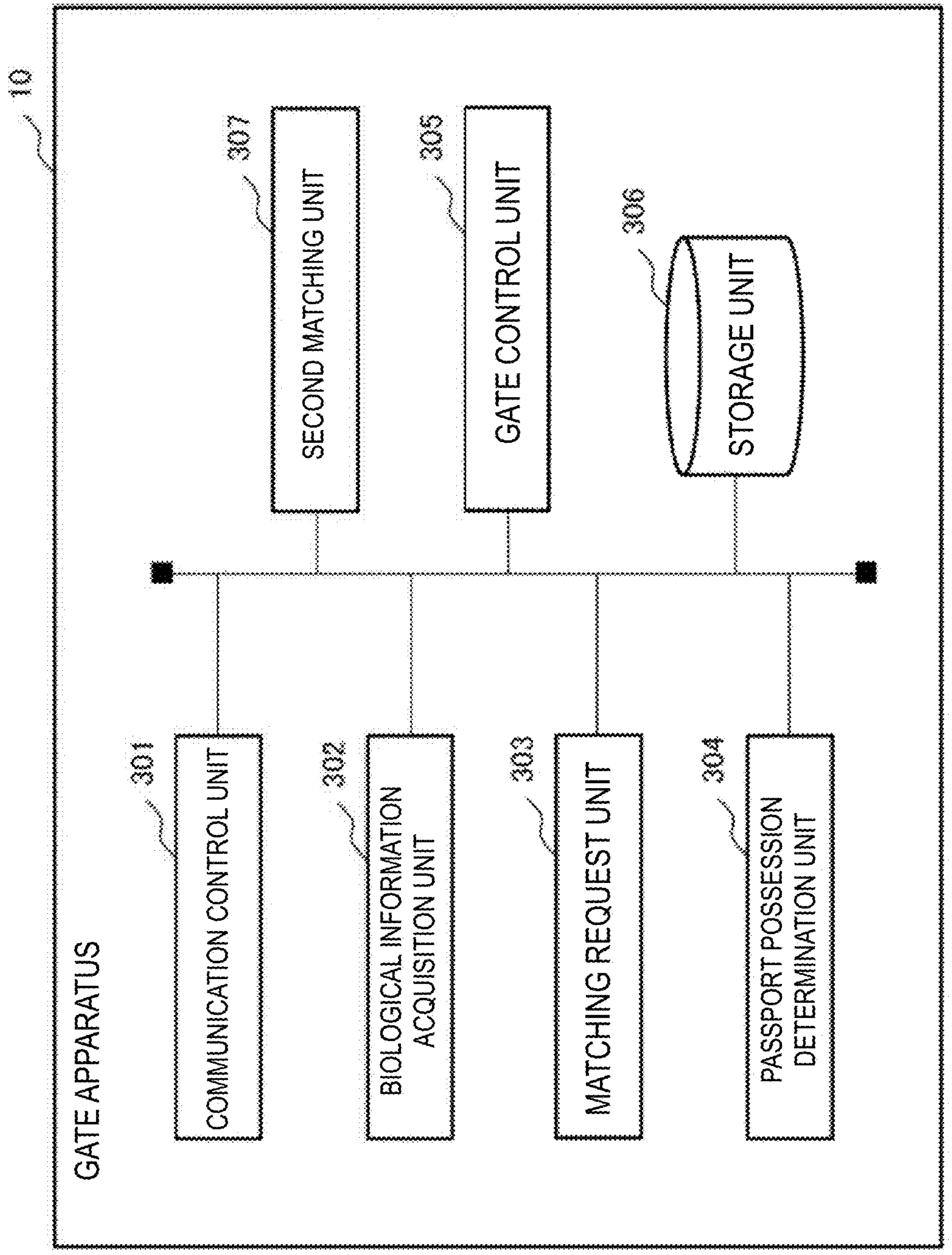
FIG. 10 is a diagram illustrating an example of a processing configuration of a gate apparatus according to a second example embodiment.

FIG. 10 is a diagram for illustrating an example of a processing configuration (processing modules) of a gate apparatus 10 according to the second example embodiment. As illustrated in FIG. 10, the gate apparatus 10 includes a second matching unit 307 in addition to the components illustrated in FIG. 7.

The second matching unit 307 is means for performing matching (1-to-1 matching) to determine whether biological information about a user matches biological information read out from an IC chip in a passport that the user has brought into contact with the reader 316.

The biological information acquisition unit 302 stores acquired biological information (for example, a user's face image captured by the camera device 315) in the storage unit 306.

If the passport possession determination unit 304 succeeds in reading out information from an IC chip by using MRZ information acquired from the server apparatus 20, the passport possession determination unit 304 gives a face image included in the read information to the second matching unit 307.

The second matching unit 307 performs matching (1-to-1 matching) between the face image acquired from the passport possession determination unit 304 and the face image stored in the storage unit 306. Specifically, the second matching unit 307 calculates a feature vector from each of the two images. Next, the second matching unit 307 calculates the similarity (for example, a Euclidean distance) between these two images and determines whether the two images indicate a face image of the same person, based on a result of threshold processing on the calculated similarity. For example, if the similarity is over a predetermined value (if the distance is shorter than a predetermined value), the second matching unit 307 determines that these two face images indicate the same person.

If the second matching unit 307 succeeds in the 1-to-1 matching (if the face image of the user in front of this gate apparatus 10 matches the face image read out from the IC chip in the presented passport), the gate apparatus 10 instructs the gate control unit 305 to open the gate.

As described above, if the gate apparatus 10 succeeds in the matching between the biological information acquired from the user and the biological information read out from the IC chip presented by the user, the gate apparatus 10 opens the gate 317 so that the user can pass through the gate 317. That is, if the gate apparatus 10 determines that the distance between the feature vectors obtained from the above two items of biological information is shorter than a predetermined distance and that the two items of biological information are substantially the same, the gate apparatus 10 controls the gate 317 so that the user can pass through the gate 317.

As described above, according to the second example embodiment, 1-to-1 matching between a face image of a user obtained from the camera device 315 attached to the gate apparatus 10 and a face image read out from an IC chip in a passport presented by the user is performed. As a result of this 1-to-1 matching, if the gate apparatus 10 succeeds in authenticating the user, the gate apparatus 10 opens the gate 317. That is, according to the first example embodiment, a problem is caused if there is an inconsistency in gate user information registered in the server apparatus 20. However, according to the second example embodiment, since the gate apparatus 10 performs final authentication processing on users, users who are not supposed to pass through the gate apparatus 10 are prevented from passing through the gate apparatus 10. According to the second example embodiment, after the server apparatus 20 performs 1-to-N matching, the gate apparatus 10 performs 1-to-1 matching. In this way, it is guaranteed that the users who pass through the gate apparatus 10 possess their correct passports (their own passports).

Variation

The configurations, operations, etc. of the emigration and immigration examination systems according to the above example embodiments have been described as examples, and the above description is not intended to limit the system configurations, etc.

For example, the functions of the server apparatus 20 may entirely or partially be realized by the gate apparatus 10. Alternatively, the gate user database of the server apparatus 20 may be established in a different database server. The emigration and immigration examination system may be configured in different ways as long as the emigration and immigration examination system includes, for example, storage means (the storage unit 204) for storing the gate user information, matching means (the first matching unit 203) for performing 1-to-N matching by using the gate user information, and determination means (the passport possession determination unit 304) for determining whether the users possess their passports.

In the above example embodiments, transmission and reception of a feature vector calculated from a face image is performed between the gate apparatus 10 and the server apparatus 20. However, a face image may be transmitted from the gate apparatus 10 to the server apparatus 20. In this case, a matching request including a face image is transmitted from the gate apparatus 10 to the server apparatus 20, and the server apparatus 20 calculates a feature vector from the received face image and performs 1-to-N matching. Alternatively, a face image, not a feature vector, may be registered in the user information database of the server apparatus 20, and feature values may be calculated each time matching is performed.

Figure 11:
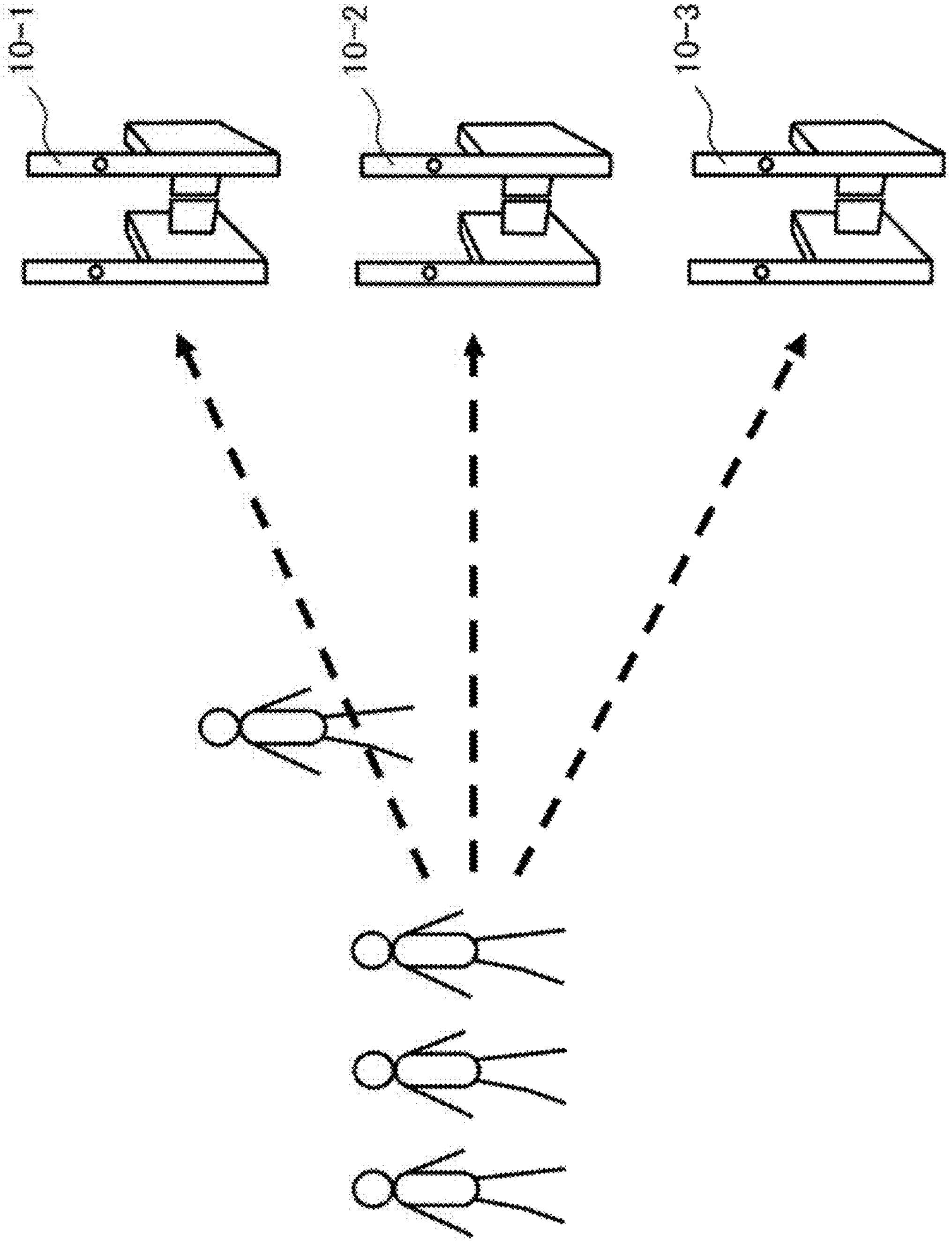
FIG. 11 is a diagram illustrating a variation of the present application.

The above example embodiments assume that the gate apparatuses 10 are placed away from each other and do not assume that a user moving to one gate apparatus 10 presents a passport to another gate apparatus 10 different from the one gate apparatus 10. However, as illustrated in FIG. 11, there are cases where a plurality of users wait in a line and a user walks to a gate apparatus 10 that has become available upon completion of the examination on a previous user. In this case, although a gate apparatus 10 captures and acquires a face image of a user in a line, this user could finally present his or her passport to a different gate apparatus 10. To solve this problem, the server apparatus 20 may transmit a reply to a matching request (a reply including MRZ information) not only to the gate apparatus 10, which has transmitted the matching request, but also to the other gate apparatuses 10. For example, FIG. 11 assumes a case in which a gate apparatus 10-2 captures an image of a user in a line and transmits a matching request including biological information about the user. In this case, the server apparatus 20 transmits MRZ information obtained as a result of the 1-to-N matching not only to the gate apparatus 10-2, which has transmitted the matching request, but also to a gate apparatus 10-1 and a gate apparatus 10-3. As a result, as illustrated in FIG. 11, even when the user walks to the gate apparatus 10-1, not the gate apparatus 10-2, the gate apparatus 10-1 can perform the emigration and immigration examination on the user (can determine whether reading of information from an IC chip by using the MRZ information has succeeded). This is because the gate apparatus 10-1 possesses the MRZ information corresponding to the passport of the user.

The example embodiments assume that a single image includes a single face area. However, depending on the situation of the examination place, a single image could include a plurality of face areas. In this case, the server apparatus 10 may extract a face area closest thereto and may transmit the corresponding biological information to the server apparatus 20. For example, the server apparatus 10 may calculate the area of the individual face area and extract a face area having the largest area. Alternatively, for example, a depth camera that can measure the distance in the depth direction may be adopted as the camera device 10. In this case, the camera device 10 may measure the distance therefrom and may extract a face image of a person closest thereto.

In addition, while the present application discloses a technique for smoothly completing emigration and immigration examination by allowing users to bring their passports into contact with the card reader 316 without opening the passports, the present application does not exclude opening of the passports by the users. For example, if a predetermined condition is met, a user may be requested to open his or her passport, and the examination may be performed on the opened passport. For example, when a result of the matching by the server apparatus 20 is relatively low (when the similarity is lower than a predetermined threshold), the server apparatus 20 notifies the gate apparatus 10 to that effect (that the matching result is relatively low) in addition to the MRZ information. Upon receiving the notification, the gate apparatus 10 may instruct the user to open the passport and place the page including a face photograph and MRZ on the reader 316. The gate apparatus 10 acquires biological information (face image) about the user (the user in front of the gate apparatus 10) and performs 1-to-1 matching by using this biological information and the face image obtained from an IC chip in the passport. As a result of the matching, if the gate apparatus 10 determines that the user possesses a correct passport, the gate apparatus 10 may open the gate 317.

Alternatively, if the gate apparatus 10 cannot read out information from an IC chip in a passport by using MRZ information received from the server apparatus 20, the gate apparatus 10 may request the examination target user to open and place the passport on the reader 316. In this case, as a result of the matching, if the gate apparatus 10 determines that the user possesses a correct passport, the gate apparatus 10 opens the gate 317.

The gate apparatus 10 may change its operation, depending on the attributes of the individual user. For example, in the emigration and immigration examination, while fingerprints do not need to be collected from people who have Japanese nationality, fingerprints need to be collected from people who do not have Japanese nationality. Thus, the gate apparatus 10 may determine the nationality of the individual user (Japanese, non-Japanese) based on the MRZ information acquired from the server apparatus 20 and may change the control processing including the gate opening/closing operation based on the determination result. For example, regarding the emigration and immigration examination for the non-Japanese, the gate apparatus 10 may open the gate 317 after collecting fingerprints and succeeding in the examination on the collected fingerprint.

Figure 12:
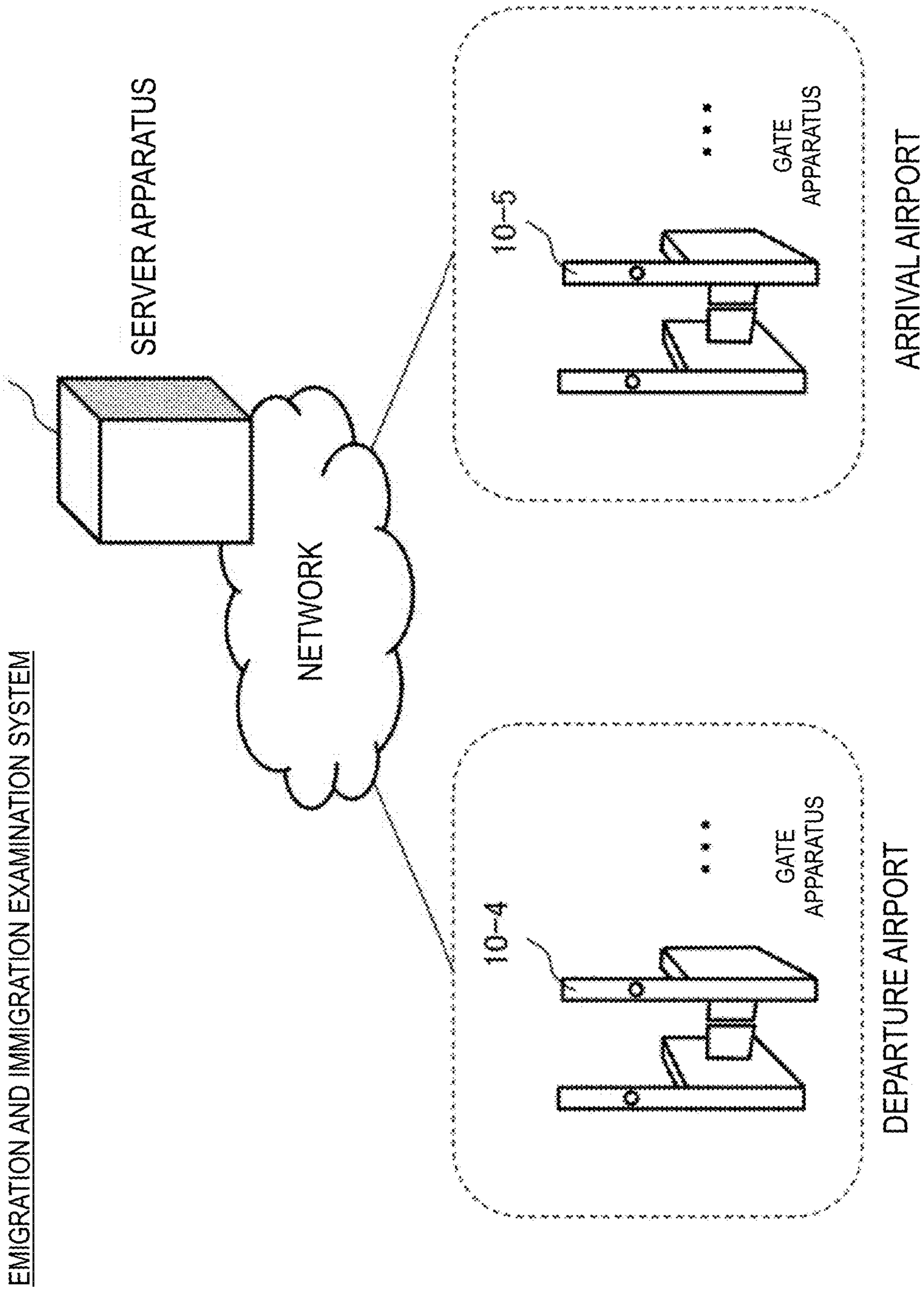
FIG. 12 is a diagram illustrating an example of a schematic configuration of an emigration and immigration examination system according to the present application.

In the above example embodiments, while the gate apparatuses 10 are installed at a single airport (a departure airport or an arrival airport), the gate apparatuses 10 may be installed at a departure airport and an arrival airport (see FIG. 12). Users whose gate user information has already been registered in the server apparatus 20 do not need to register their gate user information again and can enjoy smooth emigration and immigration examination based on the gate apparatuses 10 according to the present application.

Alternatively, as illustrated in FIG. 12, when the gate apparatuses 10 according to the present application are installed at a departure airport and an arrival airport, the gate user information about users registered in the server apparatus 10 may be deleted after their flight. The biological information and the MRZ information including the name, etc. registered in the server apparatus 20 are personal information, and it is not desirable to hold such personal information for a long time. In this case, when a gate apparatus 10 at the arrival airport (a gate apparatus 10-5 in the example in FIG. 12) notifies the server apparatus 20 that the immigration examination has successfully been completed on a user, the gate user information about this user is deleted. Alternatively, if a gate apparatus 10 at a departure airport (a gate apparatus 10-4 in the example in FIG. 12) has successfully completed the emigration examination on a user, the gate apparatus 10 may notify the gate apparatus 10-5 at the arrival airport to that effect. In this case, when the gate apparatus 10-5 completes the immigration examination on the user, the gate apparatus 10-5 may request the server apparatus 20 to delete the corresponding gate user information.

In the above example embodiment, operations of the gate apparatuses 10 and the server apparatus 20 have been described assuming that "faces" are mainly used as the biological information. However, the biological information that can be used in the present application is not limited to "faces". Other biological information such as irises may be used.

The data transmission and reception modes among the gate apparatuses 10 and the server apparatus 20 are not limited to any particular modes, and the data transmitted and received among these apparatuses may be encrypted. The face images and the feature values calculated from these face images are personal information, and to appropriately protect the personal information, it is desirable that encrypted data be transmitted and received.

The above example embodiments have been described based on a case where information is acquired from IC chips in passports by using MRZ information. However, the technique according to the present application is also applicable to other methods. That is, information about a password or a key corresponding to MRZ information may be used to read out information from an IC chip mounted on a medium such as a card similar to a passport.

In the flowcharts and sequence diagrams used in the above description, a plurality of steps (processes) are sequentially described. However, the order of the execution of the steps performed in the individual example embodiment is not limited to the described order. In the individual example embodiment, the order of the illustrated steps may be changed to the extent that a problem is not caused on the content of the individual example embodiment. For example, individual processes may be executed in parallel.

The above example embodiments have been described in detail to facilitate the understanding of the present application disclosed and not to mean that all the configurations described above are needed. In addition, if a plurality of example embodiments have been described, each of the example embodiments may be used individually or a plurality of example embodiments may be used in combination.

For example, part of a configuration according to one example embodiment may be replaced by a configuration according to another example embodiment. For example, a configuration according to one example embodiment may be added to a configuration according to another example embodiment. In addition, addition, deletion, or replacement is possible between part of a configuration according to one example embodiment and another configuration.

The industrial applicability of the present invention has been made apparent by the above description. That is, the present invention is suitably applicable, for example, to emigration and immigration examination systems at airports.

A part or the entirety of the example embodiments described above may be described as in the following supplementary notes, but is not limited to the followings.

Supplementary Note 1

A gate apparatus (10, 100) including:

an acquisition unit (101, 302) that acquires biological information about an examination target user;

a matching request unit (102, 303) that requests a server apparatus (20) that stores biological information about users and MRZ (Machine Readable Zone) information written in machine readable zones in passports issued to the users in association with each other to perform matching on the biological information about the examination target user; and a control unit (103, 305) that controls a gate (317) so that the examination target user can pass through the gate if information is successfully read out from an IC (Integrated Circuit) chip in a passport issued to the examination target user by using MRZ information determined by the matching.

Supplementary Note 2

The gate apparatus (10, 100) according to supplementary note 1, wherein, if the matching between the biological information acquired from the examination target user and biological information read out from the IC chip succeeds, the control unit (103, 305) controls the gate (317) so that the examination target user can pass through the gate.

Supplementary Note 3

The gate apparatus (10, 100) according to supplementary note 1 or 2, including a reader (316) that can read out information from a passport, wherein the reader (316) reads out information from the IC chip.

Supplementary Note 4

The gate apparatus (10, 100) according to any one of supplementary notes 1 to 3, wherein the biological information is information about faces of people.

Supplementary Note 5

The gate apparatus (10, 100) according to supplementary note 4, wherein the matching request unit (102, 303) transmits a feature vector generated from a face image of the examination target user to the server apparatus (20) as the biological information about the examination target user.

Supplementary Note 6

The gate apparatus (10, 100) according to any one of supplementary notes 1 to 5, wherein if information cannot be read out from the IC chip in the passport by using the received MRZ information, the examination target user is requested to open and place his or her passport on the reader (316).

Supplementary Note 7

A server apparatus (20) including:

a storage unit (204) that stores, as gate user information, biological information about users and MRZ (Machine Readable Zone) information written in machine readable zones in passports issued to the users in association with each other;

a matching unit (203) that searches the gate user information by using biological information about an examination target user, the biological information having been received from a gate apparatus (10, 100) that controls a gate (317) based on an emigration and immigration examination result of a user, and determines the MRZ information corresponding to the received biological information; and a communication control unit (201) that transmits the determined MRZ information to the gate apparatus (10, 100).

Supplementary Note 8

The server apparatus (20) according to supplementary note 7, wherein the storage unit (204) stores the gate user information about a plurality of users, and wherein the matching unit (203) determines the MRZ information corresponding to the received biological information by performing 1-to-N matching (N is a positive integer) in which the biological information received from the gate apparatus (10, 100) is set as the matching target.

Supplementary Note 9

The server apparatus (20) according to supplementary note 7 or 8, wherein the biological information is information about faces of people.

Supplementary Note 10

The server apparatus (20) according to supplementary note 9, wherein the matching unit (203) acquires a feature vector calculated from a face image from the gate apparatus (10, 100), calculates a distance between a feature vector stored as an individual item of gate user information and the feature vector acquired from the gate apparatus (10, 100), and determines the MRZ information corresponding to the received biological information based on the calculated distance.

Supplementary Note 11

An emigration and immigration examination system including:

a server apparatus (20) that stores, as gate user information, biological information about users and MRZ (Machine Readable Zone) information written in machine readable zones in passports issued to the users in association with each other; and a gate apparatus (10, 100) that controls a gate based on an emigration and immigration examination result of a user, wherein the gate apparatus (10, 100) acquires biological information about an examination target user and transmits the biological information about the examination target user to the server apparatus (20), wherein the server apparatus (20) searches the gate user information to determine the MRZ information corresponding to the received biological information and transmits the determined MRZ information to the gate apparatus (10, 100), and wherein, the gate apparatus (10, 100) controls the gate (317) so that the examination target user can pass through the gate if information is successfully read out from an IC (Integrated Circuit) chip in a passport issued to the examination target user by using the received MRZ information.

Supplementary Note 12

A control method of a gate apparatus (10, 100), including:

acquiring biological information about an examination target user;

requesting a server apparatus (20) that stores biological information about users and MRZ (Machine Readable Zone) information written in machine readable zones in passports issued to the users in association with each other to perform matching on the biological information about the examination target user; and controlling a gate so that the examination target user can pass through the gate if information is successfully read out from an IC (Integrated Circuit) chip in a passport issued to the examination target user by using MRZ information determined by the matching.

Supplementary Note 13

A control method of a server apparatus (20) including a storage unit (204) that stores, as gate user information, biological information about users and MRZ (Machine Readable Zone) information written in machine readable zones in passports issued to the users in association with each other, the control method of the server apparatus (20) including:

searching the gate user information by using biological information about an examination target user, the biological information having been received from a gate apparatus that controls a gate based on an emigration and immigration examination result of a user, and to determine the MRZ information corresponding to the received biological information; and transmitting the determined MRZ information to the gate apparatus (10, 100).

Supplementary Note 14

A program that causes a computer mounted on a gate apparatus (10, 100) to perform processing for:

acquiring biological information about an examination target user;

requesting a server apparatus (20) that stores biological information about users and MRZ (Machine Readable Zone) information written in machine readable zones in passports issued to the users in association with each other to perform matching on the biological information about the examination target user; and controlling a gate so that the examination target user can pass through the gate if information is successfully read out from an IC (Integrated Circuit) chip in a passport issued to the examination target user by using MRZ information determined by the matching.

Supplementary Note 15

A program that causes a computer mounted on a server apparatus (20) including a storage unit (204) that stores, as gate user information, biological information about users and MRZ (Machine Readable Zone) information written in machine readable zones in passports issued to the users in association with each other, to perform processing for:

searching the gate user information by using biological information about an examination target user, the biological information having been received from a gate apparatus that controls a gate based on an emigration and immigration examination result of a user, and to determine the MRZ information corresponding to the received biological information; and transmitting the determined MRZ information to the gate apparatus (10, 100).

The supplementary notes 11 to 15 can be expanded in the same way as the supplementary note 1 or note 7 can be expanded into the supplementary note 2, etc.

The entire disclosure of the above patent literature is incorporated herein by reference thereto. While the example embodiments of the present invention have thus been described, the present invention is not limited to these example embodiments. It is to be understood to those skilled in the art that these example embodiments are only examples and that various variations are possible without departing from the scope and sprit of the present invention. That is, the present invention of course includes various variations and modifications that could be made by those skilled in the art in accordance with the overall disclosure including the claims and the technical concept.

REFERENCE SIGNS LIST

10, 10-1 to 10-5, 100 gate apparatus
20 server apparatus
101 acquisition unit
102, 303 matching request unit
103 control unit
201, 301 communication control unit
202 user information registration unit
203 first matching unit
204, 306 storage unit
211, 311 processor
212, 312 memory
213 input-output interface
214, 314 communication interface
302 biological information acquisition unit
304 passport possession determination unit
305 gate control unit
307 second matching unit
313 input-output device
315 camera device
316 reader
317 gate

What is claimed is:

1. A gate apparatus comprising:

at least one memory storing a set of instructions; and at least one processor configured to execute the set of instructions to:

acquire biological information about an examination target user;

request a server apparatus that stores biological information about users and MRZ (Machine Readable Zone) information written in machine readable zones in passports issued to the users in association with each other to perform matching on the biological information about the examination target user;

control a gate so that the examination target user can pass through the gate if information is successfully read out from an IC (Integrated Circuit) chip in a passport in contact with a reader by using MRZ information determined by the matching;

provide a guidance to the examination target user, the guidance having contents corresponding to a cause of an inability to read the information, to contact the reader again with the passport if the information is not successfully read out from the IC chip by using MRZ information determined by the matching;

notify, in a case where the gate apparatus performs an emigration examination of the examination target user and controls the gate to allow the examination target user to pass through, another gate apparatus, the another gate apparatus performing an immigration examination of the examination target user, that the emigration examination of the examination target user has been successful; and request, in a case where the gate apparatus performs the immigration examination of the examination target user, controls the gate so that the examination target user can pass through, and is notified by another apparatus, the another apparatus performing the emigration examination, that the emigration examination of the examination target user has been successful, the server apparatus to delete the biological information of the examination target user and the MRZ information written in the machine readable zones of the passport issued to the examination target user.

2. The gate apparatus according to claim 1, wherein, if the matching between the biological information acquired from the examination target user and biological information read out from the IC chip succeeds, the at least one processor is further configured to execute the set of instructions to:

control the gate so that the examination target user can pass through the gate.

3. The gate apparatus according to claim 1, wherein the biological information is information about faces of people.

4. The gate apparatus according to claim 3, wherein the at least one processor is further configured to execute the set of instructions to:

transmit a feature vector generated from a face image of the examination target user to the server apparatus as the biological information about the examination target user.

5. The gate apparatus according to claim 1, wherein if information cannot be read out from the IC chip in the passport by using the received MRZ information, the examination target user is requested to open and place his or her passport on the reader.

6. The gate apparatus according to claim 1, wherein the at least one processor is further configured to execute the set of instructions to request, in a case where the MRZ information is not determined by the matching, the examination target user to move to a manned emigration and immigration examination place.

7. The gate apparatus according to claim 1, wherein the at least one processor is further configured to execute the set of instructions to request, in a case where the examination target user tries to pass through the gate without bringing his or her passport in contact with the reader, the examination target user to bring his or her correct passport in contact with the reader.

8. The gate apparatus according to claim 1, wherein the at least one processor is further configured to execute the set of instructions to request the server apparatus to delete the biological information of the examination target user and the MRZ information written in the machine readable zones of the passport issued to the examination target user.

9. A method implemented by one or more processors and comprising:

acquiring biological information about an examination target user;

requesting a server apparatus that stores biological information about users and MRZ (Machine Readable Zone) information written in machine readable zones in passports issued to the users in association with each other to perform matching on the biological information about the examination target user;

controlling a gate so that the examination target user can pass through the gate if information is successfully read out from an IC (Integrated Circuit) chip in a passport in contact with a reader by using MRZ information determined by the matching;

providing a guidance to the examination target user, the guidance having contents corresponding to a cause of an inability to read the information, to contact the reader again with the passport if the information is not successfully read out from the IC chip by using MRZ information determined by the matching;

notifying, in a case where a gate apparatus performs an emigration examination of the examination target user and controls the gate to allow the examination target user to pass through, another gate apparatus, the another gate apparatus performing an immigration examination of the examination target user, that the emigration examination of the examination target user has been successful; and requesting, in a case where the gate apparatus performs the immigration examination of the examination target user, controls the gate so that the examination target user can pass through, and is notified by another apparatus, the another apparatus performing the emigration examination, that the emigration examination of the examination target user has been successful, the server apparatus to delete the biological information of the examination target user and the MRZ information written in the machine readable zones of the passport issued to the examination target user.

10. A non-transitory computer-readable medium storing instructions which, when executed by one or more processors, cause the one or more processors to implement:

acquiring biological information about an examination target user;

requesting a server apparatus that stores biological information about users and MRZ (Machine Readable Zone) information written in machine readable zones in passports issued to the users in association with each other to perform matching on the biological information about the examination target user;

controlling a gate so that the examination target user can pass through the gate if information is successfully read out from an IC (Integrated Circuit) chip in a passport in contact with a reader by using MRZ information determined by the matching;

providing a guidance to the examination target user, the guidance having contents corresponding to a cause of an inability to read the information, to contact the reader again with the passport if the information is not successfully read out from the IC chip by using MRZ information determined by the matching;

notifying, in a case where a gate apparatus performs an emigration examination of the examination target user and controls the gate to allow the examination target user to pass through, another gate apparatus, the another gate apparatus performing an immigration examination of the examination target user, that the emigration examination of the examination target user has been successful; and requesting, in a case where the gate apparatus performs the immigration examination of the examination target user, controls the gate so that the examination target user can pass through, and is notified by another apparatus, the another apparatus performing the emigration examination, that the emigration examination of the examination target user has been successful, the server apparatus to delete the biological information of the examination target user and the MRZ information written in the machine readable zones of the passport issued to the examination target user.

* * * * *